(12) United States Patent
Clevorn et al.

(10) Patent No.: US 9,526,126 B2
(45) Date of Patent: Dec. 20, 2016

(54) MOBILE COMMUNICATIONS RADIO RECEIVER FOR MULTIPLE NETWORK OPERATION

(71) Applicant: Intel Mobile Communications GmbH, Neubiberg (DE)

(72) Inventors: Thorsten Clevorn, Munich (DE); Herbert Dawid, Herzogenrath (DE); Bertram Gunzelmann, Koenigsbrunn (DE)

(73) Assignee: Intel Deutschland GmbH, Neubiberg (DE)

( * ) Notice: Subject to any disclaimer, the term of this patent is extended or adjusted under 35 U.S.C. 154(b) by 254 days.

(21) Appl. No.: 14/265,423

(22) Filed: Apr. 30, 2014

(65) Prior Publication Data

US 2014/0235292 A1    Aug. 21, 2014

Related U.S. Application Data

(62) Division of application No. 13/106,925, filed on May 13, 2011, now Pat. No. 8,738,074.

(51) Int. Cl.
*H04W 76/02* (2009.01)
*H04W 88/06* (2009.01)
(Continued)

(52) U.S. Cl.
CPC ........... *H04W 76/026* (2013.01); *H04W 48/18* (2013.01); *H04W 88/06* (2013.01); *H04L 25/0202* (2013.01); *H04L 25/0224* (2013.01)

(58) Field of Classification Search
CPC combination set(s) only.
See application file for complete search history.

(56) References Cited

U.S. PATENT DOCUMENTS

| 7,047,025 | B2 | 5/2006 | Jung |
| 2004/0204035 | A1 | 10/2004 | Raghuram et al. |

(Continued)

FOREIGN PATENT DOCUMENTS

EP    2146523 A1    1/2010

OTHER PUBLICATIONS

Qualcomm Incorporated: uTP on Impact to UE Implementation due to HSDPA MP-Txu, 3GPP Draft; R1 111547 TP Impact UE IMPL HSDPA MP TX, 3rd Generation Partnership Project (3GPP), Mobile Competence Centre ; 650, Route Des Lucioles ; F-06921 Sophia-Antipolis Cedex; France, vol. RAN WG1, no. Barcelona, Spain; 20110509, May 3, 2011 (May 3, 2011), XP850491022. 6 Pages.

(Continued)

*Primary Examiner* — Junpeng Chen
(74) *Attorney, Agent, or Firm* — Eschweiler & Associates, LLC

(57) ABSTRACT

A mobile communications radio receiver for multiple radio network operation includes an RF unit for generating a first down-converted signal from a radio signal received from a first radio network and a second down-converted signal from a radio signal received from a second radio network. Further, the receiver includes a first receiving unit including a user data channel demodulator configured to demodulate a dedicated user data physical channel and a control channel demodulator configured to demodulate a common control data channel of the first radio network based on the first down-converted signal. Still further, the receiver includes a second receiving unit including a pilot channel demodulator configured to demodulate a pilot channel of the second radio network based on the second down-converted signal. A first data connection is configured to couple control data contained in the second down-converted signal to the control channel demodulator of the first receiving unit.

14 Claims, 6 Drawing Sheets

(51) Int. Cl.
  *H04W 48/18*   (2009.01)
  *H04L 25/02*   (2006.01)

(56) References Cited

U.S. PATENT DOCUMENTS

| | | |
|---|---|---|
| 2006/0160564 A1 | 7/2006 | Beamish et al. |
| 2006/0165156 A1 | 7/2006 | Kanemoto et al. |
| 2007/0076663 A1 | 4/2007 | Qi et al. |
| 2008/0102880 A1 | 5/2008 | Gholmieh et al. |
| 2009/0103516 A1 | 4/2009 | Miyano et al. |
| 2009/0190645 A1 | 7/2009 | Li et al. |
| 2009/0239575 A1* | 9/2009 | Fu .............. H04M 1/72522 455/552.1 |
| 2009/0274079 A1 | 11/2009 | Bhatia et al. |
| 2009/0316575 A1 | 12/2009 | Gholmieh et al. |
| 2010/0034114 A1 | 2/2010 | Kim et al. |
| 2010/0062800 A1 | 3/2010 | Gupta et al. |
| 2010/0075716 A1* | 3/2010 | Chang ............. H04M 1/72519 455/558 |
| 2010/0279709 A1 | 11/2010 | Shahidi et al. |
| 2010/0331019 A1 | 12/2010 | Bhattacharjee et al. |
| 2011/0044185 A1 | 2/2011 | Perraud et al. |

OTHER PUBLICATIONS

Interdigital Communications et al: "Considerations for 4-carrier HSDPA DRX Design", 3GPP Draft; R1-102089, 3rd Generation Partnership Project (3GPP), Mobile Competence Centre ; 650, Route Des Lucioles ; F-06921 Sophia-Antipolis Cedex; France, vol. RAN WGI, no. Beijing, china; 20100412, Apr. 6, 2010 (Apr. 6, 2010),XP050419412. 6 Pages.
International Search Report dated Sep. 28, 2012 for International Application No. PCT/EP2012/002030. 7 Pages.
Non-Final Office Action dated Apr. 24, 2013 for U.S. Appl. No. 13/106,925.
Final Office Action dated Nov. 6, 2013 for U.S. Appl. No. 13/106,925.
Notice of Allowance dated Feb. 4, 2014 for U.S. Appl. No. 13/106,925.

\* cited by examiner

MOBILE COMMUNICATIONS RADIO RECEIVER FOR MULTIPLE NETWORK OPERATION

REFERENCE TO RELATED APPLICATION

This application is a divisional of U.S. application Ser. No. 13/106,925 filed on May 13, 2011.

FIELD

The invention relates to mobile communications, and more particularly to the technique of receiving and processing signals from multiple radio networks.

BACKGROUND

A new feature for receivers in mobile communications is Dual-SIM-Dual-Standby (DSDS). It means the UE (user equipment) contains (at least) two SIM (subscriber identity module) cards and registers in (at least) two radio networks. If the UE is in an idle/standby state, it shall be able to receive pagings, i.e. notifications of incoming calls or messages, from both networks.

Another feature for a Dual SIM (DS) phone is to receive a paging on one network during an active connection (e.g. call) on the other network. This feature will be referred to as Dual-SIM-Single-Transport (DSST) in the following.

Still another challenging feature for a DS phone is to have at least two active connections (e.g. calls) in parallel, possibly on two different radio networks. This feature will be referred to as Dual-SIM-Dual-Transport (DSDT) in the following.

A straight-forward approach to have two active connections is to add a complete second receiver chain to the UE. However, this means additional hardware, implying additional chip area and power consumption.

For these and other reasons there is a need for improvements in mobile communication devices and methods.

BRIEF DESCRIPTION OF THE DRAWINGS

The accompanying drawings are included to provide a further understanding of embodiments and are incorporated in and constitute part of this specification. The drawings illustrate embodiments and together with the description serve to explain principles of embodiments. Other embodiments and many of the intended advantages of embodiments will be readily appreciated as they will become better understood by reference to the following detailed description. Like reference numerals designate corresponding similar parts.

DETAILED DESCRIPTION

Figure 1:
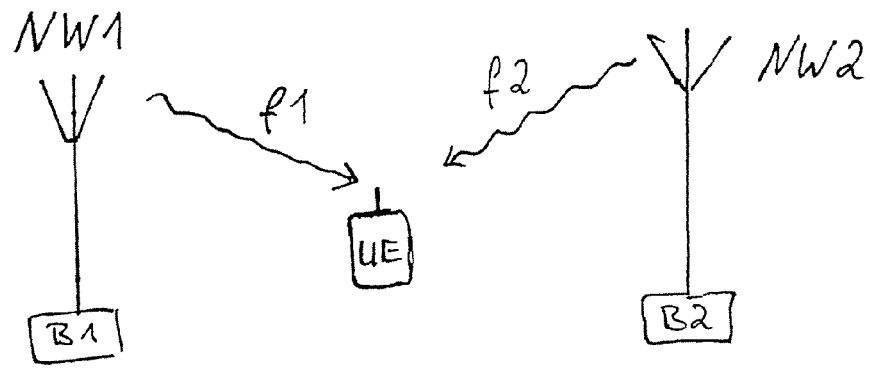
FIG. 1 is an illustration of a first multiple network scenario for a mobile communications radio receiver.

In the following detailed description, reference is made to the accompanying drawings, which form a part thereof, and in which are shown by way of illustration specific embodiments in which the invention may be practiced. In the drawings, like reference numerals are generally utilized to refer to like elements throughout the description. In the following description, for purposes of explanation, numerous specific details are set forth in order to provide a thorough understanding of one or more aspects of embodiments of the invention. It may be evident, however, to one skilled in the art that one or more aspects of the embodiments of the invention may be practiced with a lesser degree of these specific details. In other instances, known structures and devices are shown in a simplified representation in order to facilitate describing one or more aspects of the embodiments of the invention. The following description is therefore not to be taken in a limiting sense, and the scope of the invention is defined by the appended claims.

The various aspects summarized may be embodied in various forms. The following description shows by way of illustration various combinations and configurations in which the aspects may be practiced. It is understood that the described aspects and/or embodiments are merely examples, and that other aspects and/or embodiments may be utilized and structural and functional modifications may be made without departing from the scope of the present disclosure. In particular, it is to be understood that the features of the various exemplary embodiments described herein may be combined with each other, unless specifically noted otherwise.

As employed in this specification, the terms "coupled" and/or "electrically coupled" are not meant to mean that the elements must be directly coupled together; intervening elements may be provided between the "coupled" or "electrically coupled" elements.

The mobile communications radio receiver described herein will be referred to as UE (user equipment) and may be employed in terminal devices of wireless communication systems, in particular in mobile phones or other mobile terminal devices.

By way of example, FIG. 1 illustrates a first multiple network scenario for a mobile communications radio receiver (UE). The UE is configured to register in two networks NW1 and NW2. In this embodiment, the networks NW1 and NW2 are operated on different frequency bands f1 and f2. Thus, since the UE must be available to receive pagings from the NW1 operator and the NW2 operator, the UE must be able to tune to frequency bands f1 and f2. By way of example, as shown in FIG. 1, different base stations B1, B2 (i.e. different cells) may be used by the networks NW1 and NW2. However, it is also possible that networks NW1 and NW2 use shared base stations, wherein B1=B2 (i.e. the same cells).

Figure 2:
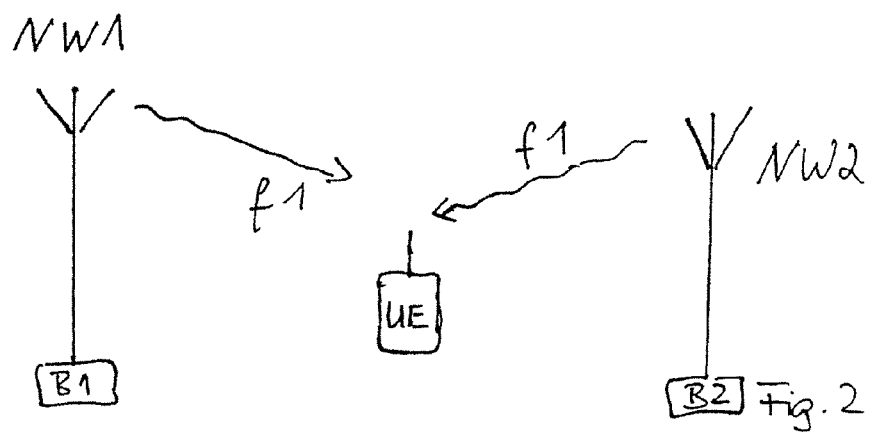
FIG. 2 is an illustration of a second multiple network scenario for a mobile communications radio receiver.

FIG. 2 illustrates a second multiple network scenario for an UE. The UE is configured to register in two networks NW1 and NW2. In contrast to the scenario illustrated in FIG. 1, the networks NW1 and NW2 are operated on the same frequency band f1. Thus, the UE is available to receive user data (e.g. a voice signal, a data signal etc.) from the NW1 operator and the NW2 operator if tuned to frequency band f1. By way of example, as shown in FIG. 2, different base stations B1, B2 (i.e. different cells) may be used by the networks NW1 and NW2. However, it is also possible that networks NW1 and NW2 use shared base stations, wherein B1 =B2 (i.e. the same cells).

Throughout this description, the signals received from the first and second networks NW1, NW2 are different, i.e. they contain different information.

Figure 3:
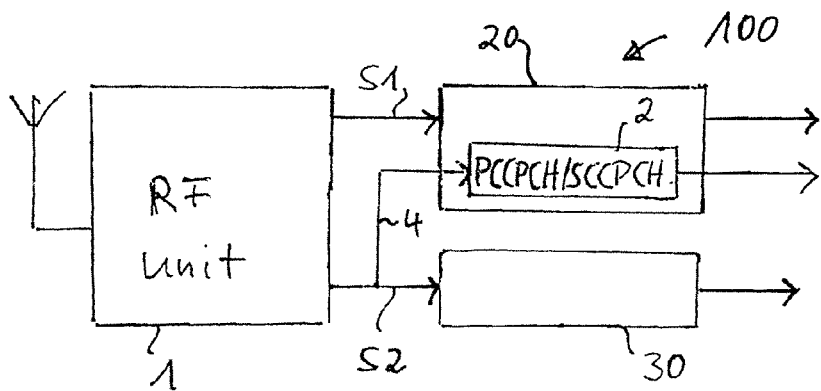
FIG. 3 is block diagram illustrating an embodiment of a mobile communications radio receiver.

FIG. 3 is a block diagram illustrating an embodiment of an UE 100. UE 100 comprises an RF unit 1, a first receiver 20 for demodulating a first down-converted signal S1 from a radio signal received from the first radio network NW1 and a second receiver 30 for demodulating a second down-converted signal S2 from a radio signal received from the second radio network NW2. The first receiver 20 comprises, inter alia, a control channel demodulator 2 which may be operated to demodulate a common control channel (e.g. the first and/or second common control channels PCCPCH, SCCPCH) of the first radio network NW1 based on the first down-converted signal S1.

In this embodiment, the control channel demodulator 2 of the first receiver 20 is connected by a data connection 4 to signal S2 which contains the common control channel signal of the second network NW2. This allows for resource sharing between the first and second receivers 20, 30. More specifically, during DSDT, when there is an active connection established on network NW1, i.e. the first receiver 20 is active to demodulate e.g. speech data of a call on network NW1, the control channel resources for demodulating the common control channel(s) of network NW1 of the first receiver 20 are not used continuously. Therefore, the control channel demodulator 2 of the first receiver 20 may be used to demodulate the common control channel signal of the second network NW2 received via data connection 4. In other words, the signal which contains the common control channel of the second network NW2 is routed via data connection 4 to the control channel demodulator 2 of the first receiver 20. Thus, common control data on the second network NW2 may be detected in the first receiver 20. Note that the first receiver 20 may be a full HSUPA (High Speed Uplink Packet Access) receiver which has a common control channel demodulator 2 and the second receiver 30 may be a reduced HSUPA receiver which has no common control channel demodulator. Together, receivers 20 and 30 may be a dual-cell/dual-band HSUPA receiver.

By way of example, if the first receiver 20 has no spare or unused control channel demodulator 2 during an active connection on the first network NW1, the control channel demodulator 2 of the first receiver 20 may be operated in time multiplex to alternatingly demodulate a common control channel of the first network NW1 and a common control channel of the second network NW2. That way, it is possible to have two active connections in parallel. Possible cases are, e.g., to have a voice plan on the first network NW1, a data plan on the second network NW2 and to do the voice call on NW1 concurrently with the data connection on NW2.

If two (or more) active connections are processed on the UE 100, the possibility of conflicts due to requests overlapping in time exists. In this case, a priority decision may be taken, e.g., based on user settings or network settings. By way of example, the priority decision may be based on the number of repetitions and/or the length of the repetition interval of the critical information sent on the first network NW1 and/or the second network NW2 to UE 100. As critical information such as e.g. a message or control information needed to maintain the active connection is usually repeated (e.g., it may be retransmitted if receipt thereof is not acknowledged by the UE 100), the chance is high that, e.g., missing one message or control information due to a conflict does not lead to a loss of connection because the message or control information is repeated.

Thus, depending on the priority settings, either the active connection on the first network NW1 or the active connection on the second network NW2 may be prioritized, and in both cases both operations could be performed (even though the non-prioritized operation may be delayed for a specific time). The priority setting (common control channel demodulation of the first or second network NW1 or NW2 prioritized) may be adapted on the basis of the settings of the two networks NW1, NW2.

Figure 4:
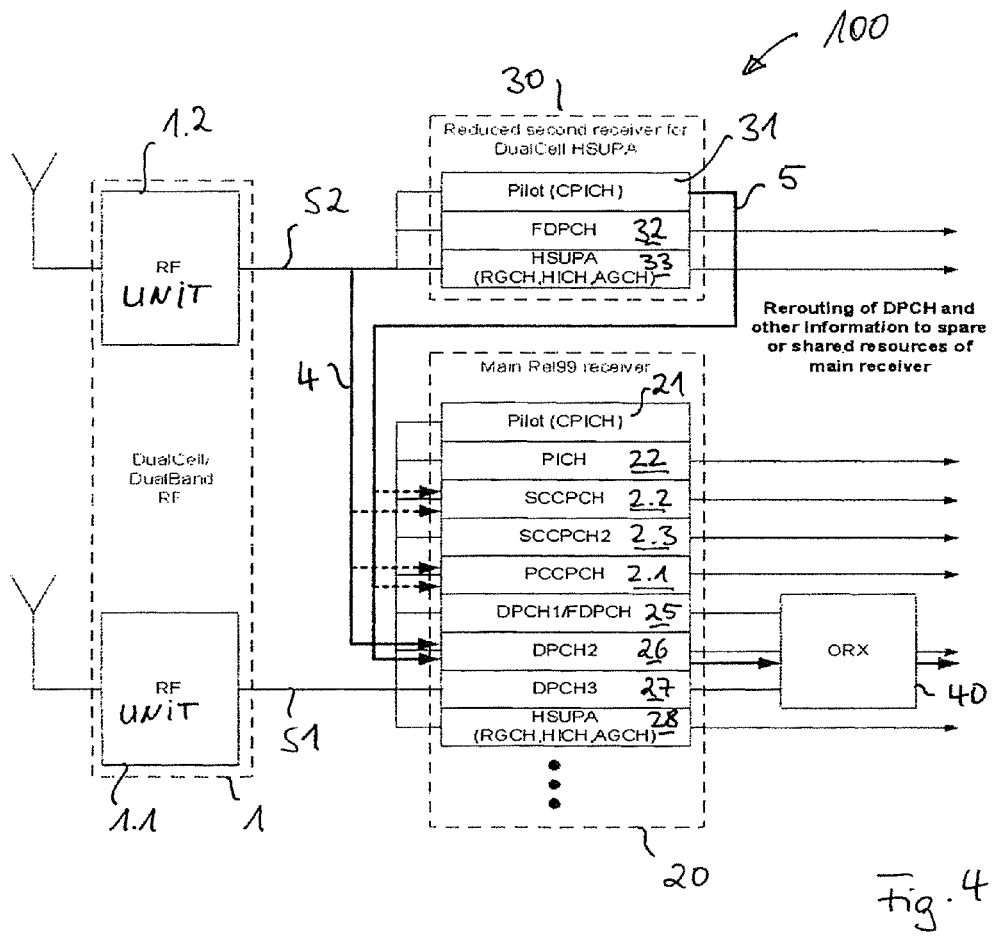
FIG. 4 is block diagram illustrating an embodiment of a mobile communications radio receiver.

FIG. 4 illustrates a more detailed block diagram of one embodiment of UE 100. By way of example, the RF unit 1 may comprise two RF stages 1.1 and 1.2. The RF stages 1.1 and 1.2 may be tuned to different frequency bands in one embodiment. RF stage 1.1 comprises an RF down-converter and provides the first down-converted signal S1 from a radio signal received from network NW1 and RF stage 1.2 comprises an RF down-converter and provides the second down-converted signal S2 from a radio signal received from network NW2. Thus, different down-conversion frequencies may be concurrently used in the RF stages 1.1 and 1.2, respectively. The RF unit 1 may, in one embodiment, be used in a dual-cell/dual-band environment using different frequency bands for transmissions of networks NW1 and NW2 as shown in FIG. 1.

FIG. 4 further illustrates a block diagram of the first and second receivers 20 and 30 contained in UE 100, respectively. As mentioned earlier in conjunction with FIG. 3, the UE 100 may contain a first or main receiver 20 and a second or reduced receiver 30. The main receiver 20, which may be, in one embodiment, an UMTS Rel99 receiver, may comprise a number of demodulators, e.g. a CPICH (Common Pilot CHannel) demodulator 21 for pilot demodulation, a PICH (Paging Indicator CHannel) demodulator 22, a PCCPCH (Primary Common Control Physical CHannel) demodulator 2.1, a first SCCPCH (Secondary Common Control Physical CHannel) demodulator 2.2 for control data demodulation such as, e.g., PCH (Paging CHannel) demodulation in case a PI (Paging Indicator) is detected by the PICH demodulator 22, a second SCCPCH demodulator 2.3, a DPCH1/FDPCH (Dedicated Physical CHannel/Fractional Dedicated Physical CHannel) demodulator 25, two additional DPCH demodulators 26, 27 and an HSUPA (High Speed Uplink Packet Access) demodulator 28 demodulating the corresponding RGCH (Relative Grant CHannel), HICH (Hybrid ARQ Indicator CHannel) and AGCH (Absolute Grant CHannel).

The reduced receiver 30 may contain a number of demodulators which are needed for dual-carrier HSUPA capability, namely a CPICH demodulator 31 for pilot demodulation, a FDPCH demodulator 32 and an HSUPA demodulator 33 demodulating the corresponding RGCH, HICH and AGCH.

It is to be noted that in HSUPA uplink data is transmitted on two different carriers. Thus, to receive the corresponding (different) HSUPA control channels, an UE having HSUPA capability needs a second receiver. To limit semiconductor chip area and power consumption, the second receiver may be stripped down to the functions necessary for the demodulation of the HSUPA control channel on the second carrier. The reduced receiver 30 shown in FIG. 4 is such a second receiver configured for HSUPA control channel demodulation. Note that in one embodiment, this reduced receiver 30 may not contain any DPCH demodulator, since on the second carrier no Rel99 data downlink channel DPCH exists. However, it must include a FDPCH (fractional DPCH) demodulator 32. Further, in one embodiment, the reduced receiver 30 does not include a PCCPCH and/or a SCCPCH and/or a PICH demodulator, see UE 100 shown in FIG. 4. This may also apply to the UE 100 illustrated in FIG. 3.

Further, the UE 100 in one embodiment may contain only one single main receiver 20 employing, e.g., demodulators 21, 22, 25, 26, 27, 28, 2.1, 2.2, 2.3 and only one single reduced receiver 30 employing, e.g., demodulators 31 to 33.

Similar to the illustration in FIG. 3, a data connection 4 is used to route signal S2, which contains the PCCPCH, the SCCPCH and the DPCH on the second network NW2, to the main receiver 20, and, more specifically, e.g., to the inputs of the PCCPCH demodulator 2.1, the SCCPCH demodulator 2.2 and the second DPCH demodulator 26 (referred to as DPCH2), respectively.

In one embodiment, the DPCH2 demodulator 26 of the main receiver 20 may be used to demodulate the DPCH of the second radio network NW2 (note that the FDPCH demodulator 32 in the reduced receiver 30 is not operable to demodulate a DPCH). This second DPCH demodulator 26 (as well as a third DPCH demodulator 27 referred to as DPCH3) may exist in the main receiver 20 due to the so-called multicode feature stipulated in the UMTS (Universal Mobile Telecommunications System) specifications, where an active connection may be assigned up to three DPCHs to increase the data rates. However, with the introduction of HSDPA (High Speed Downlink Packet Access), this feature is not or only very rarely used any more. Therefore, one of the spare DPCH demodulators 26, 27 in the main receiver 20 may be used to demodulate the DPCH of the second radio network NW2.

Since the main receiver 20 is operating an active connection, e.g., a call, on the first network NW1 (i.e. the DSDT case is considered), there may not be any completely unused common control channel demodulation resources in the main receiver 20 to be used for demodulating the corresponding channels (e.g. PCCPCH, SCCPCH, etc) of the second radio network NW2 (which can not be demodulated in the reduced receiver 30 because appropriate demodulators operable to demodulate these channels are missing in the reduced receiver 30). However, as described above, a time multiplexing of one or more of these common control channel demodulators between down-converted signal S1 and down-converted signal S2 (coupled to the main receiver 20 via data connection 4) is possible.

The second or reduced receiver 30 may comprise a channel estimator to generate channel estimates based on the second down-converted signal S2. Here, by way of example, the CPICH demodulator 31 may be used as channel estimator. Thus, at an output of the CPICH demodulator 31, channel estimates indicative of the channel characteristics of the communication link associated with the second network NW2 are provided. These channel estimates are routed via a data connection 5 to the main receiver 20.

The channel estimates generated in the reduced receiver 30 and provided via data connection 5 may be input to the PCCPCH demodulator 2.1 and/or the PCCPCH demodulator 2.2 and/or the DPCH2 (or DPCH3) demodulator 26 (or 27) of the main receiver 20 in order to demodulate the PCCPCH and/or the SCCPCH and/or the DPCH on the second carrier (second network NW2). This is possible since these resources are either time-multiplexed or unused during DSDT in UE 100. When rerouting the common control channel information and/or user data of the second network NW2 to the time-multiplexed or unused demodulators 2.1, 2.2, 26, 27 in the main receiver 20, the outputs of these demodulators 2.1, 2.2, 26, 27 have to be interpreted by downstream decoder circuitry (only exemplarily shown for DPCH demodulators 25, 26, 27) to be indicative of the corresponding control channel information or user data on the second network NW2 rather than on the first network NW1.

As known in the art, the receivers 20, 30 are also referred to as inner receivers (IRX) and may, for instance, be implemented by a RAKE receiver. The outputs of the various demodulators 2.1, 2.2, 2.3, 21, 22, 25 to 28 and 31 to 33 are indicated by arrows and may be coupled to individual decoders. In FIG. 4, by way of example and for the sake of illustrative ease, only a channel decoder 40 for decoding the outputs of the DPCH1/FDPCH demodulator 25 and the DPCH2 and DPCH3 demodulators 26, 27 is shown. Such channel decoder 40 is also referred to as outer receiver (ORX) in the art. It is to be noted that the UE 100 may comprise a number of channel decoders (not shown) with each channel decoder being configured to decode a specific channel signal received from one channel demodulator 2.1, 2.2, 2.3, 21, 22, 25 to 28 of the main receiver 20 and from one channel demodulator 31 to 33 of the reduced receiver 30.

Figure 5:
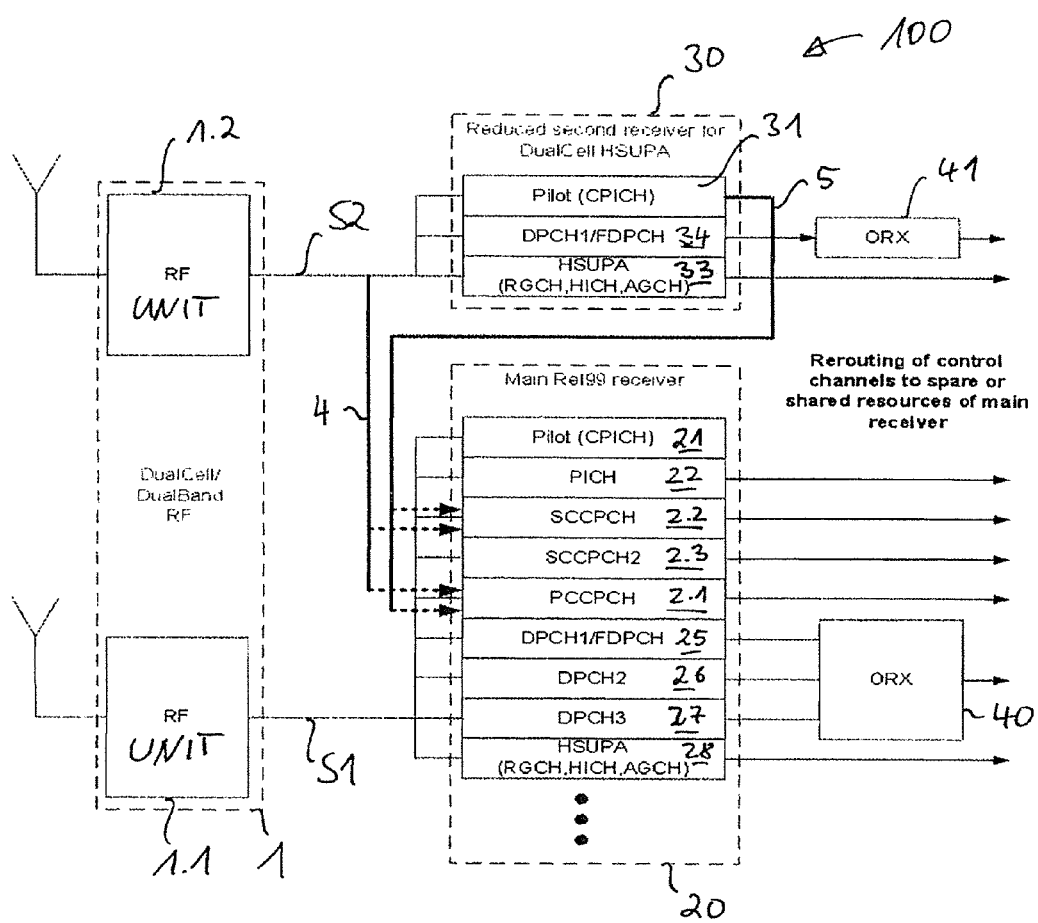
FIG. 5 is block diagram illustrating an embodiment of a mobile communications radio receiver.

FIG. 5 illustrates a more detailed block diagram of one embodiment of UE 100. The configuration and operation of UE 100 shown in FIG. 5 is similar to the configuration and operation of UE 100 shown in FIG. 4. In view of the similarities, the corresponding description to FIG. 4 is applicable to FIG. 5, and reiteration is avoided for the sake of brevity. However, in FIG. 5, the reduced receiver 30 still includes a full DPCH demodulation capability, namely DPCH1/FDPCH demodulator 34. Such reduced receiver 30 may be employed in, e.g., an HSUPA receiver if one reuses a standard DPCH1/FDPCH demodulator unit rather than a (fractional) FDPCH demodulator (although a FDPCH demodulator would be sufficient in HSUPA).

In this case, only one or more of the control channels like PCCPCH and/or SCCPCH of the second radio network NW2 are transferred via data connection 4 to the full main receiver 20. The DPCH of the second radio network NW2 may be demodulated in the DPCH1/FDPCH demodulator 34 of the reduced receiver 30.

Depending on the availability of ORX capability for the reduced receiver 30, the UE 100 may include an additional channel decoder 41 (ORX) for decoding the output of the DPCH1/FDPCH demodulator 34 of the reduced receiver 30 as shown in FIG. 5. Otherwise, the output of the DPCH1/FDPCH demodulator 34 may be routed to an input of the channel decoder 40 (ORX) which is coupled to the DPCH demodulators 25, 26, 27 of the main receiver 20 and is also used to decode the DPCH of the first network NW1 (this case is not illustrated in FIG. 5).

Figure 6:
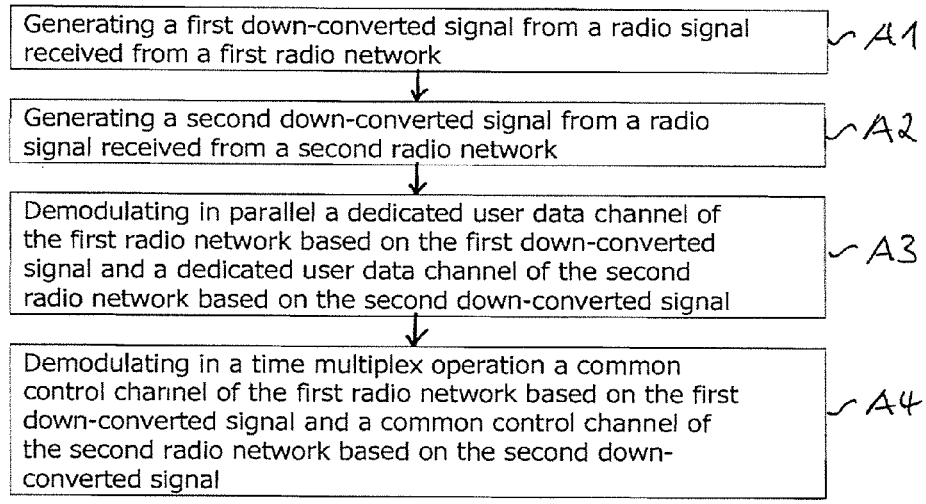
FIG. 6 is a flowchart of an embodiment of a method of demodulating user data of two radio networks in a mobile communications radio receiver.

FIG. 6 is a flowchart of an embodiment of a method of demodulating user data of the first and second radio network NW1, NW2 in a mobile communications radio receiver. This method may be performed by UE 100 as shown in FIGS. 3 to 5, for example.

As already described above, a first down-converted signal S1 from a radio signal received from a first radio network NW1 and a second down-converted signal S2 from a radio signal received from a second radio network NW2 are generated at A1 and A2, respectively. Thus, there are two active data connections established with the first and second network NW1, NW2. For instance, as shown in FIGS. 4 and 5, RF stages 1.1 and 1.2 may be used to concurrently generate down-converted signals S1 and S2, respectively.

At A3, a dedicated user data channel of the first radio network NW1 based on the first down-converted signal S1 and a dedicated user data channel of the second radio network NW2 based on the second down-converted signal S2 are demodulated in parallel. Exemplary implementations of an UE for concurrently demodulating the two user data channels in respective DPCH demodulators are illustrated by way of example in FIGS. 4 and 5.

At A4, a common control channel of the first radio network NW1 based on the first down-converted signal S1 and a common control channel of the second radio network NW2 based on the second down-converted signal S2 are demodulated in a time multiplex operation. Exemplary implementations of an UE for demodulating the at least two common control channels by shared hardware are illustrated by way of example in FIGS. 4 and 5.

Thus, resource (or hardware) sharing is used between the main and reduced receivers 20, 30, which requires mainly some additional data rerouting and control functions such as e.g. control of the multiplex operation. The control functions may be implemented in firmware. That way, it is possible to receive two DPCH from two different radio networks NW1, NW2 without any major hardware additions to a standard dual-cell HSUPA receiver.

Figure 7:
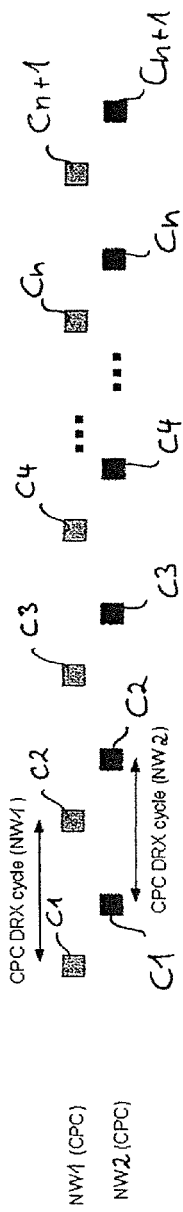
FIG. 7 is a timing diagram illustrating a first scenario of continuous packet connectivity on a first network and a second network.
Figure 8:
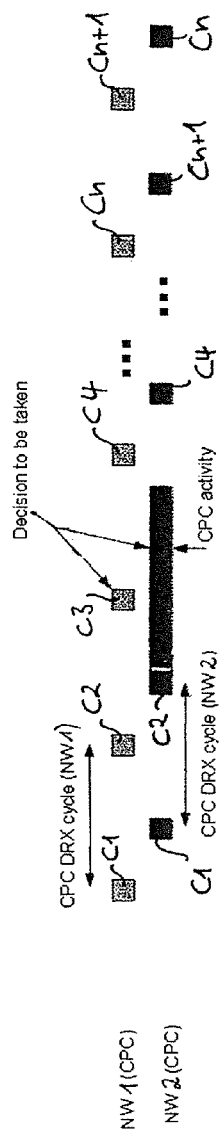
FIG. 8 is a timing diagram illustrating a second scenario of continuous packet connectivity on a first network and a second network.
Figure 9:
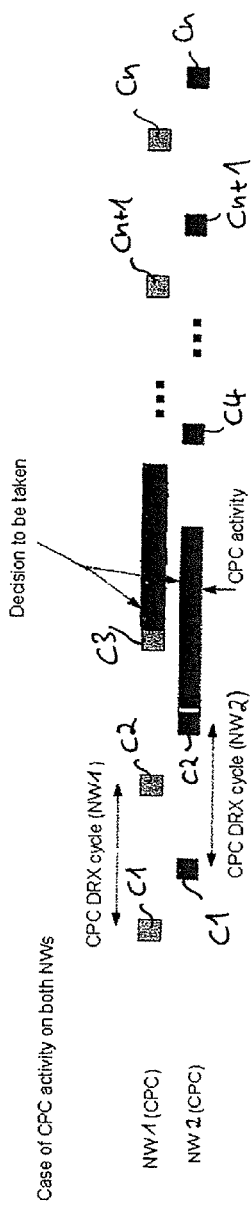
FIG. 9 is a timing diagram illustrating a third scenario of continuous packet connectivity on a first network and a second network.

According to another aspect, discontinuous reception (DRX) cycles of continuous packet connectivity (CPC) on the first network NW1 and on the second network NW2 are used to maintain active connections with both networks NW1, NW2 in parallel. FIGS. 7 to 9 are timing diagrams illustrating various scenarios of parallel reception of two CPC on the first network NW1 and on the second network NW2.

With CPC an UE can have an active connection with a network, but if no data is sent the UE only checks in certain intervals if data is available. In between these checks the UE can be turned off to save power. The intervals between these discontinuous reception (DRX) instances in CPC are referred to as CPC DRX cycles. CPC is a recently introduced feature of UMTS.

FIG. 7 illustrates the timing of a first CPC connection between an UE and the first network NW1 and a second CPC connection between the (same) UE and the second network NW2. The time spans of the DRX instances during which the UE checks whether data is available on the first network NW1 are indicated by C1, C2, C3, . . . , Cn, Cn+1 in the upper row of FIG. 7. Similarly, the time spans of the DRX instances during which the UE checks whether data is available on the second network NW2 are indicated by C1, C2, C3, . . . , Cn, Cn+1 in the lower row of FIG. 7. The horizontal axis corresponds to time.

Considering, e.g., the first network NW1, the demodulator of the UE can be turned off during the CPC DRX cycles between the DRX instances C1, C2, C3, . . . , Cn, Cn+1 shown in the upper row of FIG. 7 to save power. Here, it may be temporarily turned on during these periods in order to listen at the DRX instances of the second network NW2 to notifications on available date on the second network NW2 as illustrated in the lower row of FIG. 7.

In one embodiment, if the second network NW2 is operated on a different frequency band f2 than the frequency band f1 used by the first network NW1, see FIG. 1, the UE has to be tuned to the second frequency band f2 upon activation during the CPC DRX cycles of the first network NW1. In another embodiment, if the first and second networks NW1 and NW2 operate on the same frequency band f1, see FIG. 2, the UE may not be tuned to another frequency band when activated during the CPC DRX cycles of the first network NW1 to listen to CPC activity on the second network NW2.

More specifically, FIG. 7 illustrates a case with no CPC activity on both networks NW1, NW2. Further, the (time spans of the) DRX instances C1, C2, C3, . . . , Cn, Cn+1 during which the UE is turned on and both networks NW1, NW2 are checked for available data do not overlap in time. More specifically, the DRX instances C1, C2, C3, . . . , Cn, Cn+1 of the second network NW2 fall completely into the time gaps (DRX cycles) between the DRX instances C1, C2, C3, . . . , Cn, Cn+1 of the first network NW1. Therefore, no conflicts will occur, and both CPC connections can be supported and kept up in parallel by (optional) alternating down-conversion and alternating demodulation of NW1 and NW2 signals.

FIG. 8 illustrates a case of CPC activity (i.e. downlink data transfer beyond the CPC notifications on available data transmitted during the cyclic DRX instances) on the second network NW2. The CPC activity occurs directly after the data available check during DRX instance C2 on the second network NW2 yielded a positive result. Thereafter, a period of CPC activity, i.e. an active continuous downlink user data transfer may occur on network NW2.

Since the DRX instance C3 on network NW1 overlaps with the period of CPC activity on network NW2, it would typically not be possible to listen to the network notification concerning the data available check at DRX instance C3 on network NW1, because there is no DRX cycle anymore on network NW2. However, depending e.g. on the setting of the number of repetitions of data packets on the second network NW2, it might be possible to shortly interrupt the data transfer on the second network NW2 through higher layers (TCP/IP . . . ) and listing instead to possible network notifications on available data at DRX instance C3 of the first network NW1.

Listening to a CPC notification (also referred to as CPC status in the art) on the first network NW1 may require only a few time slots. Therefore, even in the case of a continuous active CPC data connection on the second network NW2 (see FIG. 8), it might be possible to shortly listen to the first network NW1 during the DRX instances C1, C2, . . . , Cn, Cn+1 of the first network NW1, because the lost data packets on the second network NW2 will probably be repeated. Thus, the user would not notice the loss of packets on the second network NW2 connection. Even for a long ongoing data transfer on the second network NW2, the intentional packet dropping due to listening for CPC status on the first network NW1 will only result in a slightly lower throughput of the connection on the second network NW2.

Therefore, still considering the situation illustrated in FIG. 8, a decision may be taken: Either the notification of network NW1 on available data at DRX instance C3 is dropped (because the UE keeps on listening to network NW2) or some data packets on network NW2 are intentionally dropped (because the UE is switched to listen to network NW1 during the DRX instance C3 to demodulate any possible notification of network NW1 on available data).

In other words, a first option is that a notification of the first network NW1 on available data is lost because of the ongoing CPC activity on the second network NW2. Since such notifications are typically repeated several times (e.g., the notification may be repeated after a delay of one or more CPC DRX cycles at DRX instances C4, ..., Cn, Cn+1), there is a high probability to receive at least the delayed notification. The user probably would not notice the short delay until CPC activity may start on network NW1.

A second option is to prioritize the data available checks at the DRX instances of the first network NW1 over the continuity of the CPC activity on the second network NW2. In this case the notification of available data on network NW1 would always be received, whereas some data packets of the CPC activity on the second network NW2 would be missed. However, missing some data packets of one or a limited number of CPC activities would probably not drop the CPC connection on the second network NW2, because CPC has to take packet loss (e.g. by regular fading) into account. Thus, the drop of some data packets of network NW2 could be compensated by higher layer retransmission. Therefore, missing some data packets of one or a limited number of CPC activities may probably only mean a small degradation in throughput of the data transfer on network NW2.

Therefore, depending on priority settings, either CPC activity on one network or listening to notifications for available data on the other network may be prioritized, and in both cases both operations could be performed (even though the non-prioritized operation may be delayed for a specific time such as one or more CPC DRX cycles or degraded in throughput). The priority setting (CPC activity or DRX notifications prioritized) may be adapted on the basis of the settings of the two networks NW1, NW2. By way of example, the priority setting may depend on the number of repetitions of notifications on available data and/or the number of repetitions of lost data packets during an active CPC connection and/or the length of the CPC DRX cycle.

Of course, as long as the phases of the CPC activity on network NW2 fit into the DRX cycles of network NW1, with an existing but idle CPC connection, both the downlink user data on network NW2 and the CPC status information on network NW1 may be received by (optional) alternating down-conversion and alternating demodulation of NW1 and NW2 signals. In this respect, the case shown in FIG. 8 is similar to the case shown in FIG. 7.

FIG. 9 illustrates a case of concurrent CPC activity (beyond the CPC DRX cycles) on both networks NW1 and NW2. The CPC activity on network NW2 occurs directly after the data available check (positive result) at DRX instance C2 on network NW2. The CPC activity on network NW1 occurs directly after the data available check (also positive result) at DRX instance C3 on network NW1. Since the periods of CPC activities on networks NW1 and NW2 overlap in time, a decision may be taken: Either one CPC connection is dropped (while the other may be continued) or both CPC connections are run with e.g. 50% packet loss rate by alternating the demodulation of the respective user data channels (and, if only one RF stage is provided, by alternating the down-conversion of the respective user data signals). The latter approach may result in a reduced throughput on both networks NW1 and NW2, but both CPC connections may survive due to higher layer retransmissions of lost data packets. This decision (concerning a conflict of concurrent CPC activities on two or more networks) may also be determined based on a priority setting.

Figure 10:
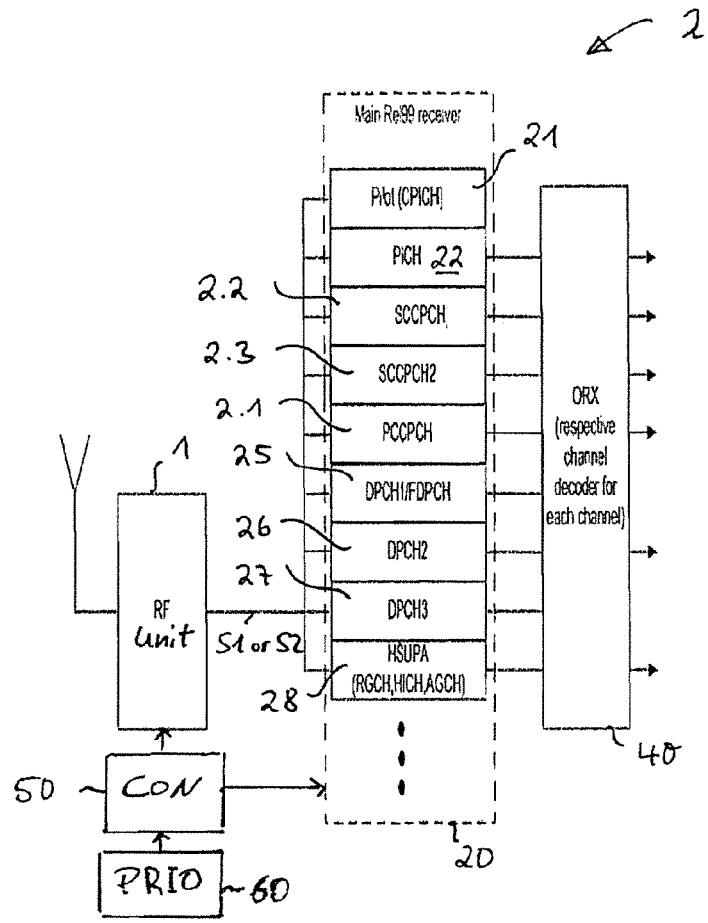
FIG. 10 is block diagram illustrating an embodiment of a mobile communications radio receiver.

FIG. 10 illustrates an embodiment of an UE 200 configured to be operated using one or more of the procedures described above with reference to FIGS. 7 to 9. The UE 200 may comprise one single receiver 20 which may be identical to the main receiver 20 shown in FIG. 4 or 5. More specifically, the receiver 20, which may be an UMTS Rel99 receiver, may comprise a CPICH demodulator 21 for pilot demodulation, a PICH demodulator 22, a SCCPCH demodulator 2.2, a second SCCPCH demodulator 2.3, a PCCPCH demodulator 2.1, a DPCH1/FDPCH demodulator 25, two additional DPCH demodulators 26, 27 and a HSUPA demodulator 28. The outputs of the various demodulators 2.1, 2.2, 2.3, 21, 22, 25 to 28 are provided to a channel decoder 40 (ORX). The channel decoder 40 may contain for each channel a respective channel decoder to decode the specific channel signal received from one channel demodulator 2.1, 2.2, 2.3, 21, 22, 25 to 28 of the receiver 20.

The UE 200 may comprise a single-band RF unit 1, which can be tuned to the frequency bands f1 and f2 in a sequential manner, but which can not down-convert the frequency bands f1 and f2 concurrently. The single-band RF unit 1 may be controlled by a control unit 50. The control unit 50 is configured to switch the single-band RF unit 1 to either generate the first down-converted signal S1 from the first network NW1 or to generate the second down-converted signal S2 from the second network NW2. The receiver 20 is informed by the control unit 50 on this selection.

In one embodiment the receiver 20 of UE 200 is configured to demodulate only one of the first and second down-converted signals S1, S2 at a time. In particular, for example, only one user data signal is demodulated at a time. Thus, the receiver 20 may include, e.g., only one single CPICH demodulator 21 for pilot demodulation and/or only one single PICH demodulator 22 for PI demodulation and/or only one single PCCPCH demodulator 2.1.

The UE 200 may further comprise a priority selection unit 60. In one embodiment the priority selection unit 60 is configured to select a priority setting in case of conflicting notifications on available data and CPC DRX activity on networks NW1 and NW2 as explained in conjunction with FIG. 8 and/or in case of conflicting CPC DRX activities on networks NW1 and NW2 as explained in conjunction with FIG. 9.

It is to be noted that the control unit 50 and/or the priority selection unit 60 may be implemented in dedicated hardware or in software (firmware). If the control unit 50 and/or the priority selection unit 60 are implemented in software, the embodiments described in FIGS. 7 to 10 may not require any hardware changes to existing UEs. They do not even require a dual-band/dual-cell RF unit 1. The embodiments described in FIGS. 7 to 10 may work on every single-band CPC capable hardware and allow a high chance of supporting two or more CPC connections on two or more networks NW1, NW2, ..., at the same time. The procedures of operating such single-band CPC capable hardware in accordance with the description herein may be implemented in the firmware of the UE 200.

Figure 11:
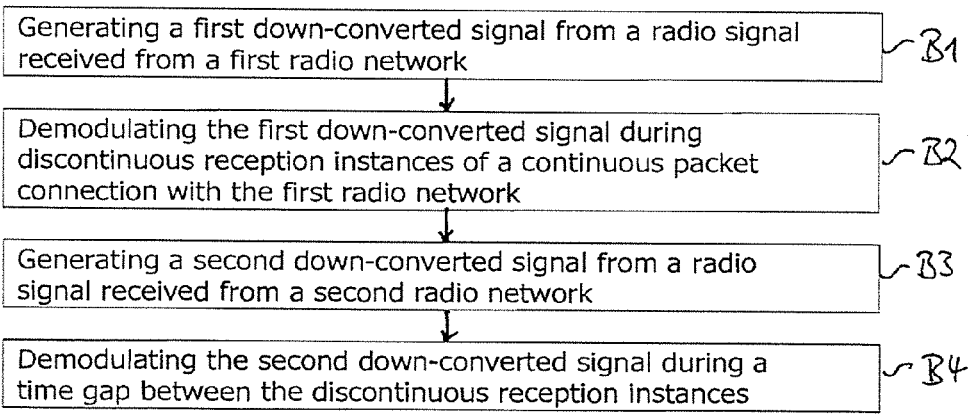
FIG. 11 is a flowchart of an embodiment of a method of demodulating a signal transmitted by a second network while having a discontinuous reception continuous packet connection established with a first network.

According to FIG. 11, the UE 200 may operate as follows: A first down-converted signal S1 from a radio signal received from a first network NW1 is generated at B1. This first down-converted signal S1 is demodulated during (at least one of) the DRX instances of a CPC connection with the first radio network NW1 at B2. Further, a second down-converted signal S2 from a radio signal received from a second radio network NW2 is generated at B3. This second down-converted signal S2 is demodulated during a time gap between the DRX reception instances.

Thus, during the time gap (DRX cycle period) between consecutive DRX instances, the demodulation and/or generation of the first down-converted signal S1 may be stopped and the demodulation and/or generation of the second down-converted signal S2 from a radio signal received from the second network NW2 may be started.

It is to be noted that the reception of speech or data via two active connections with two networks as described above in all embodiments can be done in any RAT (Radio Access Technology) receivers. By way of example, in case of one 3G (third generation) and one 2G (second generation) connection, each receiver chain may receive separately the corresponding 2G and 3G user data information. Thus, the first network NW1 and/or the second network NW2 may each be a 2G network, a 3G network or e.g. a LTE network, and any combinations of such different networks are feasible.

The methods, aspects and embodiments described herein all relate to DSDT scenarios, where two connections with two different networks NW1, NW2 are considered. Further, also a combination and interaction with other types of Dual-SIM capabilities, for instance DSDS (Dual-SIM-Dual-Standby), where both receiver chains are in a standby mode (i.e. with no active connection on any one of the networks NW1, NW2), or DSST (Dual-SIM-Single-Transport), where a paging from one network may be received while having an active connection with the other network, are possible. Further, the methods, aspects and embodiments described herein can be extended to three or more networks and/or they can be combined.

Further, it is to be noted that in all aspects and embodiments described herein, the UEs 100 and 200 may be configured for using HSDPA and HSUPA.

In addition, while a particular feature or aspect of an embodiment of the invention may have been disclosed with respect to only one of several implementations, such feature or aspect may be combined with one or more other features or aspects of the other implementations as may be desired and advantageous for any given or particular application. This application is intended to cover any adaptations or variations of the specific embodiments discussed herein, and the invention is intended to be limited only by the claims and the equivalence thereof.

What is claimed is:

1. A method of demodulating user data in a mobile communications radio receiver, comprising:
   generating a first down-converted signal from a radio signal, wherein the first down-converted signal includes a first common control signal associated with a first radio network;
   generating a second down-converted signal from a radio signal, wherein the second down-converted signal includes a second common control signal associated with a second radio network;
   demodulating in parallel a dedicated user data channel of the first radio network based on the first down-converted signal and a dedicated user data channel of the second radio network based on the second down-converted signal; and
   demodulating, with a shared common control channel demodulator, in a time multiplex operation:
      the first common control signal; and
      the second common control signal.

2. The method of claim 1, wherein the dedicated user data channels of the first and second radio networks are demodulated concurrently by at least two Dedicated Physical Channel demodulators.

3. The method of claim 1, further comprising:
   generating channel estimates based on the first down-converted signal;
   generating channel estimates based on the second down-converted signal; and
   inputting the channel estimates based on the first down-converted signal and the channel estimates based on the second down-converted signal to the shared common control channel demodulator.

4. A mobile communications radio receiver for multiple radio network operation, comprising:
   an RF unit configured to generate a first down-converted signal from a radio signal received from a first radio network and a second down-converted signal from a radio signal received from a second radio network;
   a first receiver;
   a second receiver;
   a data connection between the first receiver and the second receiver configured to transmit a common control channel signal in the second down-converted signal to the first receiver;
   wherein the first receiver comprises:
      a first user data channel demodulator configured to demodulate a first dedicated user data physical channel contained in the first down-converted signal;
      a shared control channel demodulator configured to demodulate in a time-multiplex operation a common control channel signal of the first radio network based on the first down-converted signal and the common control channel signal of the second radio network; and
   wherein the second receiver comprises a second user data channel demodulator configured to demodulate a second dedicated user data physical channel contained in the second down-converted signal; and
   wherein the first and second user data channel demodulators are configured to demodulate the first and second user data physical channels in parallel.

5. The mobile communications radio receiver of claim 4, wherein the RF unit comprises:
   a first RF down-converter configured to generate the first down-converted signal; and
   a second RF down-converter configured to generate the second down-converted signal.

6. The mobile communications radio receiver of claim 4, wherein the mobile communications radio receiver is configured to receive one or more of a Common Pilot Channel, a Fractional Dedicated Physical Channel, a Relative Grant Channel, a Hybrid ARQ Indicator Channel and an Absolute Grant Channel.

7. A mobile communications radio receiver for multiple radio network operation, comprising:
   an RF unit configured to generate a first down-converted signal from a radio signal received from a first radio network and a second down-converted signal from a radio signal received from a second radio network;
   a first receiving unit comprising a first user data channel demodulator configured to demodulate a first dedicated user data physical channel contained in the first down-converted signal and a control channel demodulator configured to demodulate in a time-multiplex operation a common control channel of the first radio network based on the first down-converted signal and a common control channel of the second radio network based on the second down-converted signal; and a second receiving unit comprising a second user data channel demodulator configured to demodulate a second dedicated user data physical channel contained in the second down-converted signal, wherein the second receiving unit comprises no control physical channel demodulator for demodulating any common control physical data;

wherein the first and second user data channel demodulators are configured to demodulate the first and second dedicated user data physical channels in parallel.

8. The mobile communications radio receiver of claim 7, further comprising:

a first data connection configured to couple control data contained in the second down-converted signal to the control channel demodulator of the first receiving unit.

9. The mobile communications radio receiver of claim 7, further comprising:

a first outer receiver configured to receive an output of the first receiving unit.

10. The mobile communications radio receiver of claim 7, further comprising:

a second outer receiver configured to receive an output of the second receiving unit.

11. The mobile communications radio receiver of claim 7, further comprising:

a channel estimator configured to generate channel estimates based on the second down-converted signal, and a second data connection configured to couple the channel estimates from the channel estimator to an input of the first receiving unit.

12. The mobile communications radio receiver of claim 11, wherein the channel estimator comprises a pilot channel demodulator contained in the second receiving unit.

13. The mobile communications radio receiver of claim 7, wherein the first receiving unit is an UMTS Rel99 receiver.

14. The mobile communications radio receiver of claim 7, wherein the second receiving unit is a reduced receiver comprising only demodulators for demodulating one or more of a Common Pilot Channel, a Fractional Dedicated Physical Channel, a Relative Grant Channel, a Hybrid ARQ Indicator Channel and an Absolute Grant Channel.

* * * * *